United States Patent

Schmermund

[15] 3,675,537
[45] July 11, 1972

[54] CONTROL ARRANGEMENTS FOR AN AUTOMATIC MACHINE TOOL

[72] Inventor: Alfred Schmermund, 62 Kornerstrasse, 5820 Gevelsberg, Germany

[22] Filed: Oct. 8, 1970

[21] Appl. No.: 79,159

[30] Foreign Application Priority Data

Oct. 23, 1969 Great Britain........................52038/69

[52] U.S. Cl............................................................90/13.9
[51] Int. Cl..........................................................B23c 1/18
[58] Field of Search..................................................90/13, 13.9

[56] References Cited

UNITED STATES PATENTS

| | | | |
|---|---|---|---|
| 3,437,007 | 4/1969 | Schmermund | 90/13.9 |
| 3,455,206 | 7/1969 | Hoglund | 90/13.9 |

*Primary Examiner*—Francis S. Husar
*Attorney*—Nolte and Nolte

[57] ABSTRACT

This invention relates to a control arrangement for an automatic tool having a linear profiled master cam which is mounted on a movable carrier with its linear profile inclined at a predetermined angle to the direction of displacement of the carrier. The linear profile is sensed by a main follower which is coupled to control means for controlling a milling tool operating on a rotating workpiece. A composite auxiliary cam is rotated with the workpiece and an auxiliary follower co-operating with the composite auxiliary cam is coupled to the carrier to control the displacement thereof, whereby the control of the milling tool is so dependent on the shape of the composite auxiliary cam as to cause the tool to form the workpiece with a cam profile corresponding to that of the composite cam.

Preferably, the predetermined angle may be adjusted to vary the size of the cam profile formed on the workpiece compared with that of the composite auxiliary cam.

4 Claims, 5 Drawing Figures

PATENTED JUL 11 1972 3,675,537

INVENTOR
ALFRED SCHMERMUND
BY Nolte & Nolte
ATTORNEYS

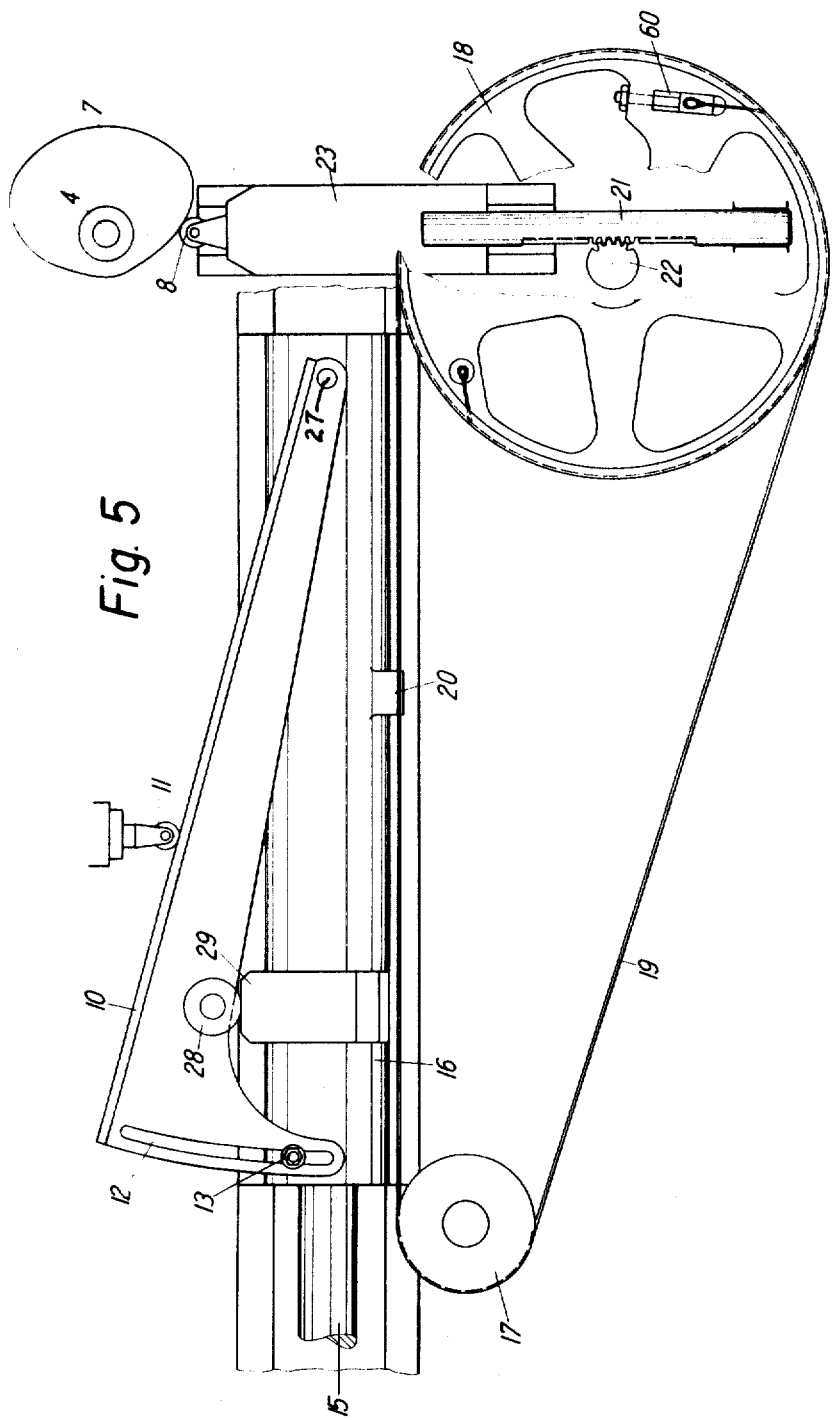

CONTROL ARRANGEMENTS FOR AN AUTOMATIC MACHINE TOOL

BACKGROUND OF THE INVENTION

The present invention relates to control devices for automatic cutting machines for providing curves on workpieces and is an improvement in or modification of the invention described in U.S. Pat. No. 3,437,007. The main claim in the aforesaid patent specification is as follows:

A control arrangement for an automatic machine tool comprising a movable carrier, an original curve member mounted on said carrier, means sensing the shape of said curve member, means for displacing and moving said sensing means and said original curve member relative to each other, means remote from said curve member and sensing means influencing the relative movement therebetween, control means in association with said curve member and sensing means for controlling the movement of a machine tool head, means linking said influencing means with said curve member and sensing means, said influencing means being capable of varying the speed of relative movement of said sensing means and said original curve member, said control means including a movable control member, means for selectively positioning said control means whereby the ratio of movement of said sensing means and movement of said control member can be varied.

Preferably, the original curve member comprises a master cam having a profile which is subjected to reciprocating movements in response to displacements of an auxiliary cam follower forming a component of the influencing means. Such an arrangement enables cam profiles to be produced wherein an outwardly extending portion of the profile, which is cut by a milling tool responding to a displacement of the master cam in one direction, is followed by an inwardly extending portion of the profile, which corresponds to a displacement of the master cam in the reverse direction.

The arrangement described in the above mentioned patent has disadvantages when it is required to produce a single cam having a profile wherein two successive portions are outwardly extending, or inwardly extending.

SUMMARY OF THE INVENTION

According to the present invention there is provided a control arrangement for an automatic tool comprising a main follower arranged to sense the profile of a linear master cam, control means responsive to the main cam follower and means comprising an auxiliary composite cam and an auxiliary follower for influencing the time during which the main follower senses portions of the master cam, the auxiliary follower controlling movement of the master cam, and means for varying the ratio of movement of the main follower to movement of a control member of the control means, the arrangement being such that when the control means is connected to the tool head of the machine and the composite cam is moved in dependence on the rotation of a workpiece, the control of the tool is so dependent on the shape of the composite cam as to cause the tool to form the workpiece with a cam profile corresponding to that of the composite cam.

Preferably, the angle between the linear profile of the master cam and the direction of movement of the master cam is adjustable, whereby the size of the cam formed on the workpiece relative to that of the composite cam may be varied.

Preferably, the control device comprises a belt attached to a support carrying the master cam, the belt passing round a drum and a pulley and means for rotating the drum in response to displacement of the auxiliary follower so as to transmit movements of the auxiliary follower to the master cam.

BRIEF DESCRIPTION OF THE DRAWINGS

An embodiment of the present invention will now be more particularly described with reference to the accompanying drawings, in which:

FIG. 5 shows part of a control device for an automatic cutting tool.

DESCRIPTION OF THE PREFERRED EMBODIMENT

Figure 1:
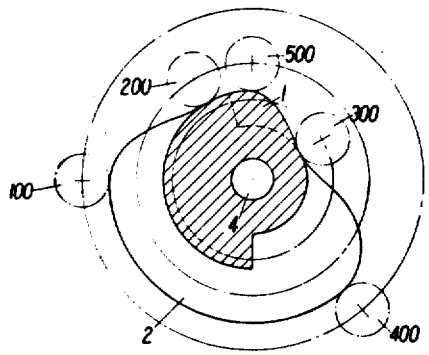
FIG. 1 shows a composite cam profile obtained by suitably superimposing the respective profiles of two separate cams.
Figure 2:
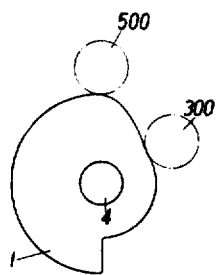
FIG. 2 shows the profile of a first one of the cams forming the composite cam profile of FIG. 1.
Figure 3:
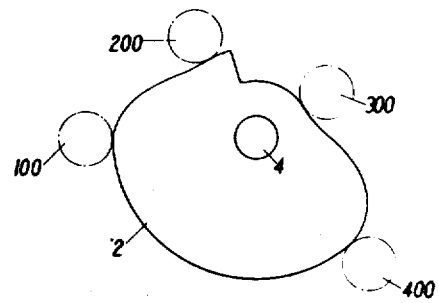
FIG. 3 shows the profile of a second one of the cams forming the composite cam profile of FIG. 1.

FIG. 1 shows a composite cam profile which may be formed by suitably superimposing a cam 1 on a cam 2. FIG. 2 shows the profile of the cam 1 having a portion of its profile so shaped that the follower is displaced radially outwards from the center shaft 4 of the cam as it moves between two positions indicated by the references 300 and 500, respectively. FIG. 3 shows the profile of the cam 2 and, as indicated in the drawing, the cam follower moves radially outwards from the cam center shaft 4 as it moves between the positions 200 and 300, moves concentrically between the positions 100 and 400 and moves towards the center shaft 4 between positions 400 and 300. As shown in FIG. 1, the two cams 1 and 2 are secured together to form a composite profile, which can be utilized by displacing a cam follower so that it follows the profile of the cam 1 between positions 300 and 200 and the profile of the cam 2 between positions 200 and 300. Thus, the cam follower is displaced outwardly from the center shaft 4 between positions 300 and 500, moves concentrically between positions 500 and 200, moves outwards between positions 200 and 100, moves concentrically between positions 100 and 400 and moves inwardly towards the shaft 4 between positions 400 and 300.

The control device for automatic cutting machines, which is described in U.S. Pat. No. 3,437,007 enables cams such as those shown in FIGS. 2 and 3 to be manufactured, but is not suitable for the manufacture of a single cam having the composite profile shown in FIG. 1.

FIG. 5 shows a modification of the automatic control device for cutting machines described in U.S. Pat. No. 3,437,007.

In FIG. 5, a composite cam profile formed by securing the two cams 1 and 2 together is mounted on a shaft 4 and the composite cam so formed is indicated by the reference 7. A workpiece which is to be milled by a milling tool to form a single cam having a profile corresponding to that of the composite cam 7 is mounted so as to be rotated synchronously with the composite cam 7 and the milling tool is controlled in response to displacements of a main cam follower 11.

The workpiece, the milling tool and the arrangement for controlling the milling tool in response to movements of the main follower are not shown in the drawing, since the control arrangement may be similar to that described in U.S. Pat. No. 3,437,007.

As shown in FIG. 5, the profile of the composite cam 7 is followed by an auxiliary cam follower 8. Displacements of the cam follower 8 are transmitted by a suitable intermediate member, which may be hydraulically operated, to a rack 21 engaging a pinion 22. The motion of the pinion 22 is transmitted to a master cam 10, having a linear profile, by means of a drum 18, fixed to the pinion 22 and rotatable with the pinion, and a belt 19 which is fixed to a support 16 carrying the master cam. The belt 19 passes over a pulley 17 and is fixed to the support 16 by means of a clamp 20. One end of the belt 19 is attached to the drum 18 via a spring tensioning device 60. The master cam 10 is attached to the support 16 by means of a pivot pin 27 and a bolt 13 which passes through a slot 12 in the master cam 10. The master cam 10 is also supported by means of a roller 28 which engages a displaceable pillar 29. In response to movement of the belt 19, the support 16 is displaced so as to slide along a shaft 15.

Figure 4:
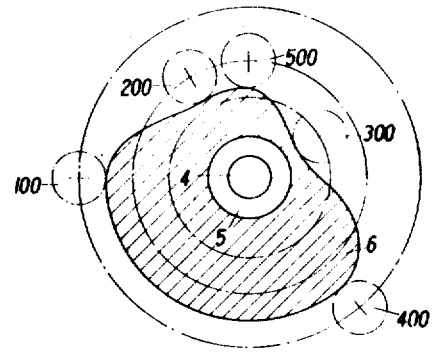
FIG. 4 shows the profile of a single cam formed by copying the composite cam profile of FIG. 1.

As the composite cam 7 and the workpiece rotate, the auxiliary follower 8 is displaced so as to follow the outline profile of the composite cam and these displacements are transmitted to the master cam 10, so as to cause reciprocating movements to be imparted to the master cam 10. In the embodiment shown in FIG. 5, the reciprocating movement of the master cam 10 causes vertical displacement of the master cam follower 11 and these vertical displacements of the master cam follower 11 are appropriately transmitted by control means, not shown in FIG. 5, to control the milling tool operating on the workpiece. In response to the control means, the workpiece is shaped by the milling tool so as to produce a single cam, or a plurality of single cams in a multiple milling machine, having a profile which corresponds to the outline profile of the composite cam 7, and such a single cam is shown in FIG. 4.

The ratio of the displacement of the auxiliary follower 8 to that of the master cam follower 11 may be varied by varying the slope of the linear profile of the master cam 10. This variation is effected by loosening the bolt 13 and rotating the master cam 10 about the pivot pin 27, after the slope has been appropriately adjusted, the pillar 29 is displaced so as to support the master cam 10 on the roller 28 and the bolt 13 is tightened. Thus, the scale to which the composite cam 7 is copied may be varied so that the cam produced may be of the same size or of larger or smaller size than the composite cam 7.

Thus, for example, in circumstances in which a small cam is required to be machined with a high degree of accuracy, the composite cam may be oversize and the copies of the composite cam are reduced to the appropriate dimensions.

I claim:

1. A control arrangement for an automatic machine tool comprising in combination:
   a movable carrier;
   a linear profiled member mounted on said carrier with the linear profile thereof inclined at a predetermined angle to the direction of diplacement of said carrier;
   a main follower in contact with said linear profile;
   means for displacing said carrier relative to said main follower;
   means remote from said linear profiled member and said main follower influencing the relative movement therebetween;
   control means in association with said linear profiled member and said main follower for controlling the movement of a machine tool head;
   said influencing means including an auxiliary composite cam, an auxiliary follower arranged to co-operate with said auxiliary composite cam and means for rotating said auxiliary composite cam with a workpiece;
   means for coupling said auxiliary follower to said carrier to control the displacement thereof in dependence on the displacement of said auxiliary follower;
   said influencing means being capable of varying the speed of relative movement of said main follower and said linear profiled member;
   said control means including a movable control member;
   means for selectively positioning said control means to vary the ratio of movement of said main follower and said control member, whereby the control of said machine tool head is so dependent on the shape of said composite cam as to cause the tool of said machine tool head to form said workpiece with a cam profile corresponding to that of said auxiliary composite cam.

2. An arrangement as defined in claim 1, wherein said linear profiled member comprises a plate cam member.

3. An arrangement as defined in claim 1, wherein said predetermined angle is adjustable, whereby the size of said cam profile formed on said workpiece relative to that of said auxiliary composite cam may be varied.

4. An arrangement as defined in claim 1, wherein said coupling means comprises a support, a drum rotatably mounted on said support, a pulley rotatably mounted of said support, a belt drive passing round said drum and said pulley and attached to said movable carrier, and means interconnecting said drum and said auxiliary follower to rotate said drum in response to displacement of said auxiliary follower and thereby transmit movements of said auxiliary follower to said carrier.

* * * * *